(12) United States Patent
Sehn (10) Patent No.: US 9,385,983 B1
(45) Date of Patent: Jul. 5, 2016

(54) GALLERY OF MESSAGES FROM INDIVIDUALS WITH A SHARED INTEREST

(71) Applicant: Snapchat, Inc., Venice, CA (US)

(72) Inventor: Timothy Sehn, Marina Del Rey, CA (US)

(73) Assignee: Snapchat, Inc., Venice, CA (US)

( * ) Notice: Subject to any disclaimer, the term of this patent is extended or adjusted under 35 U.S.C. 154(b) by 0 days.

(21) Appl. No.: 14/578,258

(22) Filed: Dec. 19, 2014

(51) Int. Cl.
*G06F 15/16* (2006.01)
*H04L 12/58* (2006.01)
*H04L 29/08* (2006.01)
*G06F 12/00* (2006.01)

(52) U.S. Cl.
CPC .......... *H04L 51/14* (2013.01); *H04L 29/08072* (2013.01); *H04L 51/32* (2013.01)

(58) Field of Classification Search
USPC .................. 709/203, 223–229, 231–233, 250
See application file for complete search history.

(56) References Cited

U.S. PATENT DOCUMENTS

| | | | |
|---|---|---|---|
| 5,999,932 A | 12/1999 | Paul | |
| 6,154,764 A | 11/2000 | Nitta et al. | |
| 6,167,435 A | 12/2000 | Druckenmiller et al. | |
| 6,204,840 B1 | 3/2001 | Petelycky et al. | |
| 6,216,141 B1 | 4/2001 | Straub et al. | |
| 6,310,694 B1 | 10/2001 | Okimoto et al. | |
| 6,353,170 B1 | 3/2002 | Eyzaguirre et al. | |
| 6,484,196 B1 | 11/2002 | Maurille | |
| 6,665,531 B1 | 12/2003 | Soderbacka et al. | |
| 6,724,403 B1 | 4/2004 | Santoro et al. | |
| 6,757,713 B1 | 6/2004 | Ogilvie et al. | |
| 6,898,626 B2 | 5/2005 | Ohashi | |
| 7,027,124 B2 | 4/2006 | Foote et al. | |
| 7,124,164 B1 | 10/2006 | Chemtob | |
| 7,149,893 B1 | 12/2006 | Leonard et al. | |
| 7,203,380 B2 | 4/2007 | Chiu et al. | |
| 7,356,564 B2 | 4/2008 | Hartselle et al. | |
| 7,519,670 B2 | 4/2009 | Hagale et al. | |
| 8,001,204 B2 | 8/2011 | Burtner et al. | |
| 8,112,716 B2 | 2/2012 | Kobayashi | |
| 8,276,092 B1 | 9/2012 | Narayanan et al. | |
| 8,279,319 B2 | 10/2012 | Date | |

(Continued)

FOREIGN PATENT DOCUMENTS

| | | |
|---|---|---|
| WO | WO-2011040821 A1 | 4/2011 |
| WO | WO-2015192026 A1 | 12/2015 |

(Continued)

OTHER PUBLICATIONS iVisit, "iVisit Mobile Getting Started", Dec. 4, 2013, iVisit, pp. 1-16.

(Continued)

*Primary Examiner* — Zarni Maung
(74) *Attorney, Agent, or Firm* — Schwegman Lundberg & Woessner, P.A.

(57) ABSTRACT

A machine includes a processor and a memory connected to the processor. The memory stores instructions executed by the processor to receive a message and a message parameter indicative of a characteristic of the message, where the message includes a photograph or a video. A determination is made that the message parameter corresponds to a selected gallery, where the selected gallery includes a sequence of photographs or videos. The message is posted to the selected gallery in response to the determination. The selected gallery is supplied in response to a request.

20 Claims, 6 Drawing Sheets

(56) References Cited

U.S. PATENT DOCUMENTS

| | | |
|---|---|---|
| 8,312,086 B2 | 11/2012 | Velusamy et al. |
| 8,312,097 B1 | 11/2012 | Siegel et al. |
| 8,379,130 B2 | 2/2013 | Forutanpour et al. |
| 8,405,773 B2 | 3/2013 | Hayashi et al. |
| 8,418,067 B2 | 4/2013 | Cheng et al. |
| 8,471,914 B2 | 6/2013 | Sakiyama et al. |
| 8,560,612 B2 | 10/2013 | Kilmer et al. |
| 8,744,523 B2 | 6/2014 | Fan et al. |
| 8,745,132 B2 | 6/2014 | Obradovich |
| 8,775,972 B2 | 7/2014 | Spiegel |
| 8,788,680 B1 | 7/2014 | Naik |
| 8,797,415 B2 | 8/2014 | Arnold |
| 8,856,349 B2 | 10/2014 | Jain et al. |
| 8,909,725 B1 | 12/2014 | Sehn |
| 9,094,137 B1 | 7/2015 | Sehn et al. |
| 9,113,301 B1 | 8/2015 | Spiegel et al. |
| 2002/0047868 A1 | 4/2002 | Miyazawa |
| 2002/0078456 A1 | 6/2002 | Hudson et al. |
| 2002/0122659 A1 | 9/2002 | Mcgrath et al. |
| 2002/0144154 A1 | 10/2002 | Tomkow |
| 2003/0016247 A1 | 1/2003 | Lai et al. |
| 2003/0017823 A1 | 1/2003 | Mager et al. |
| 2003/0037124 A1 | 2/2003 | Yamaura et al. |
| 2003/0052925 A1 | 3/2003 | Daimon et al. |
| 2003/0164856 A1 | 9/2003 | Prager et al. |
| 2004/0027371 A1 | 2/2004 | Jaeger |
| 2004/0111467 A1 | 6/2004 | Willis |
| 2004/0203959 A1 | 10/2004 | Coombes |
| 2004/0243531 A1 | 12/2004 | Dean |
| 2005/0078804 A1 | 4/2005 | Yomoda |
| 2005/0097176 A1 | 5/2005 | Schatz et al. |
| 2005/0102381 A1* | 5/2005 | Jiang et al. .................... 709/220 |
| 2005/0104976 A1 | 5/2005 | Currans |
| 2005/0114783 A1 | 5/2005 | Szeto |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2006/0114338 A1 | 6/2006 | Rothschild |
| 2006/0270419 A1 | 11/2006 | Crowley et al. |
| 2007/0040931 A1 | 2/2007 | Nishizawa |
| 2007/0073823 A1 | 3/2007 | Cohen et al. |
| 2007/0082707 A1 | 4/2007 | Flynt et al. |
| 2007/0192128 A1 | 8/2007 | Celestini |
| 2007/0214216 A1 | 9/2007 | Carrer et al. |
| 2007/0233801 A1 | 10/2007 | Eren et al. |
| 2007/0243887 A1 | 10/2007 | Bandhole et al. |
| 2007/0255456 A1 | 11/2007 | Funayama |
| 2008/0025701 A1 | 1/2008 | Ikeda |
| 2008/0033930 A1 | 2/2008 | Warren |
| 2008/0049704 A1 | 2/2008 | Witteman et al. |
| 2008/0104503 A1 | 5/2008 | Beall et al. |
| 2008/0207176 A1 | 8/2008 | Brackbill et al. |
| 2008/0208692 A1 | 8/2008 | Garaventi et al. |
| 2008/0222545 A1 | 9/2008 | Lemay |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0313346 A1 | 12/2008 | Kujawa et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089678 A1 | 4/2009 | Sacco et al. |
| 2009/0132453 A1 | 5/2009 | Hangartner et al. |
| 2009/0132665 A1 | 5/2009 | Thomsen et al. |
| 2009/0157752 A1 | 6/2009 | Gonzalez |
| 2009/0160970 A1 | 6/2009 | Fredlund et al. |
| 2009/0177299 A1 | 7/2009 | Van De Sluis |
| 2009/0265647 A1 | 10/2009 | Martin et al. |
| 2010/0082693 A1 | 4/2010 | Hugg et al. |
| 2010/0131880 A1 | 5/2010 | Lee et al. |
| 2010/0131895 A1 | 5/2010 | Wohlert |
| 2010/0159944 A1 | 6/2010 | Pascal et al. |
| 2010/0161831 A1 | 6/2010 | Haas et al. |
| 2010/0183280 A1 | 7/2010 | Beauregard et al. |
| 2010/0185665 A1 | 7/2010 | Horn et al. |
| 2010/0191631 A1 | 7/2010 | Weidmann |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0257196 A1 | 10/2010 | Waters et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0102630 A1 | 5/2011 | Rukes |
| 2011/0145564 A1 | 6/2011 | Moshir et al. |
| 2011/0211534 A1 | 9/2011 | Schmidt et al. |
| 2011/0255736 A1 | 10/2011 | Thompson et al. |
| 2011/0273575 A1 | 11/2011 | Lee |
| 2011/0283188 A1 | 11/2011 | Farrenkopf |
| 2011/0320373 A1 | 12/2011 | Lee et al. |
| 2012/0036443 A1* | 2/2012 | Ohmori et al. ................ 715/736 |
| 2012/0054797 A1 | 3/2012 | Skog et al. |
| 2012/0062805 A1 | 3/2012 | Candelore |
| 2012/0108293 A1 | 5/2012 | Law et al. |
| 2012/0110096 A1 | 5/2012 | Smarr et al. |
| 2012/0113272 A1 | 5/2012 | Hata |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0173991 A1 | 7/2012 | Roberts et al. |
| 2012/0184248 A1 | 7/2012 | Speede |
| 2012/0200743 A1 | 8/2012 | Blanchflower et al. |
| 2012/0210244 A1 | 8/2012 | De Francisco Lopez et al. |
| 2012/0212632 A1 | 8/2012 | Mate et al. |
| 2012/0220264 A1 | 8/2012 | Kawabata |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0278387 A1 | 11/2012 | Garcia et al. |
| 2012/0278692 A1 | 11/2012 | Shi |
| 2012/0299954 A1 | 11/2012 | Wada et al. |
| 2012/0307096 A1 | 12/2012 | Bray et al. |
| 2012/0323933 A1 | 12/2012 | He et al. |
| 2013/0024757 A1 | 1/2013 | Doll et al. |
| 2013/0045753 A1 | 2/2013 | Obermeyer et al. |
| 2013/0050260 A1 | 2/2013 | Reitan |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0085790 A1 | 4/2013 | Palmer et al. |
| 2013/0090171 A1* | 4/2013 | Holton et al. .................... 463/42 |
| 2013/0095857 A1 | 4/2013 | Garcia et al. |
| 2013/0104053 A1* | 4/2013 | Thornton et al. ............. 715/752 |
| 2013/0111514 A1 | 5/2013 | Slavin et al. |
| 2013/0128059 A1 | 5/2013 | Kristensson |
| 2013/0145286 A1 | 6/2013 | Feng et al. |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0194301 A1 | 8/2013 | Robbins et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |

(56) References Cited

U.S. PATENT DOCUMENTS

| | | | |
|---|---|---|---|
| 2013/0290443 A1 | 10/2013 | Collins et al. | |
| 2013/0304646 A1* | 11/2013 | de Geer | 705/44 |
| 2013/0344896 A1 | 12/2013 | Kirmse et al. | |
| 2013/0346869 A1 | 12/2013 | Asver et al. | |
| 2013/0346877 A1 | 12/2013 | Borovoy et al. | |
| 2014/0011538 A1 | 1/2014 | Mulcahy et al. | |
| 2014/0019264 A1 | 1/2014 | Wachman et al. | |
| 2014/0032682 A1 | 1/2014 | Prado et al. | |
| 2014/0047016 A1* | 2/2014 | Rao | 709/203 |
| 2014/0047045 A1 | 2/2014 | Baldwin et al. | |
| 2014/0047335 A1 | 2/2014 | Lewis et al. | |
| 2014/0049652 A1 | 2/2014 | Moon et al. | |
| 2014/0052485 A1 | 2/2014 | Shidfar | |
| 2014/0052633 A1 | 2/2014 | Gandhi | |
| 2014/0057660 A1 | 2/2014 | Wager | |
| 2014/0082651 A1 | 3/2014 | Sharifi | |
| 2014/0122658 A1 | 5/2014 | Haeger et al. | |
| 2014/0122787 A1 | 5/2014 | Shalvi et al. | |
| 2014/0129953 A1 | 5/2014 | Spiegel | |
| 2014/0143143 A1 | 5/2014 | Fasoli et al. | |
| 2014/0149519 A1 | 5/2014 | Redfern et al. | |
| 2014/0155102 A1 | 6/2014 | Cooper et al. | |
| 2014/0173457 A1 | 6/2014 | Wang et al. | |
| 2014/0189592 A1 | 7/2014 | Benchenaa et al. | |
| 2014/0207679 A1 | 7/2014 | Cho | |
| 2014/0214471 A1 | 7/2014 | Schreiner, III | |
| 2014/0222564 A1 | 8/2014 | Kranendonk et al. | |
| 2014/0279061 A1 | 9/2014 | Elimeliah et al. | |
| 2014/0279436 A1 | 9/2014 | Dorsey et al. | |
| 2014/0280537 A1 | 9/2014 | Pridmore et al. | |
| 2014/0282096 A1 | 9/2014 | Rubinstein et al. | |
| 2014/0317302 A1 | 10/2014 | Naik | |
| 2014/0325383 A1 | 10/2014 | Brown et al. | |
| 2015/0046278 A1 | 2/2015 | Pei et al. | |
| 2015/0071619 A1 | 3/2015 | Brough | |
| 2015/0087263 A1 | 3/2015 | Branscomb et al. | |
| 2015/0088622 A1 | 3/2015 | Ganschow et al. | |
| 2015/0350136 A1 | 12/2015 | Flynn, III et al. | |
| 2015/0365795 A1 | 12/2015 | Allen et al. | |
| 2015/0378502 A1 | 12/2015 | Hu et al. | |
| 2016/0099901 A1 | 4/2016 | Allen et al. | |

FOREIGN PATENT DOCUMENTS

| | | |
|---|---|---|
| WO | WO-2016054562 A1 | 4/2016 |
| WO | WO-2016065131 A1 | 4/2016 |

OTHER PUBLICATIONS

Melanson, Mike, "This text message will self destruct in 60 seconds", available on Feb. 11, 2011, retrieved from readwrite.com on Feb. 18, 2015, link: http://readwrite.com/2011/02/11/this_text_message_will_self_destruct_in_60_seconds, referred to hereinafter as READ-WRITE.

Sawers, Paul, "Snapchat for iOS Lets You Send Photos to Friends and Set How long They're Visible for", May 7, 2012, <http://thenextweb.com/apps/2012/05/07/Snapchat-for-ios-lets-you-send-photos-to-friends-and-set-how-long-theyre-visiblefor/#!xCjrp>, pp. 1-5.

U.S. Appl. No. 14/808,283, filed Jul. 24, 2015, Prioritization of Messages Within Gallery.

"U.S. Appl. No. 14/304,855, Final Office Action mailed Feb. 18, 2015", 10 pgs.

"U.S. Appl. No. 14/304,855, Non Final Office Action mailed Mar. 18, 2015", 9 pgs.

"U.S. Appl. No. 14/304,855, Non Final Office Action mailed Oct. 22, 2014", 11 pgs.

"U.S. Appl. No. 14/304,855, Notice of Allowance mailed Jun. 1, 2015", 11 pgs.

"U.S. Appl. No. 14/304,855, Response filed Feb. 25, 2015 to Final Office Action mailed Feb. 18, 2015", 5 pgs.

"U.S. Appl. No. 14/304,855, Response filed Apr. 1, 2015 to Non Final Office Action mailed Mar. 18, 2015", 4 pgs.

"U.S. Appl. No. 14/304,855, Response filed Nov. 7, 2014 to Non Final Office Action mailed Oct. 22, 2014", 5 pgs.

"U.S. Appl. No. 14/505,478, Advisory Action mailed Apr. 14, 2015", 3 pgs.

"U.S. Appl. No. 14/505,478, Final Office Action mailed Mar. 17, 2015", 16 pgs.

"U.S. Appl. No. 14/505,478, Non Final Office Action mailed Jan. 27, 2015", 13 pgs.

"U.S. Appl. No. 14/505,478, Response filed Jan. 30, 2015 to Non Final Office Action mailed Jan. 27, 2015", 10 pgs.

"U.S. Appl. No. 14/505,478, Response filed Apr. 1, 2015 to Final Office Action mailed Mar. 17, 2015", 6 pgs.

"U.S. Appl. No. 14/523,728, Non Final Office Action mailed Dec. 12, 2014", 10 pgs.

"U.S. Appl. No. 14/523,728, Notice of Allowance mailed Mar. 24, 2015", 8 pgs.

"U.S. Appl. No. 14/523,728, Notice of Allowance mailed Apr. 15, 2015", 8 pgs.

"U.S. Appl. No. 14/523,728, Notice of Allowance mailed Jun. 5, 2015", 8 pgs.

"U.S. Appl. No. 14/523,728, Response filed Aug. 25, 2014 to Non Final Office Action mailed Jan. 16, 2015", 5 pgs.

"U.S. Appl. No. 14/529,064, Non Final Office Action mailed Mar. 12, 2015", 20 pgs.

"U.S. Appl. No. 14/529,064, Response filed Feb. 5, 2015 to Restriction Requirement mailed Feb. 2, 2015", 6 pgs.

"U.S. Appl. No. 14/529,064, Response filed Mar. 26, 2015 to Non Final Office Action mailed Mar. 12, 2015", 8 pgs.

"U.S. Appl. No. 14/529,064, Restriction Requirement mailed Feb. 2, 2015", 5 pgs.

"U.S. Appl. No. 14/578,271, Restriction Requirement mailed Apr. 23, 2015", 8 pgs.

"iVisit Mobile Getting Started", iVisit, (Dec. 4, 2013), 1-16.

Melanson, Mike, "This text message will self destruct in 60 seconds", readwrite.com, [Online]. Retrieved from the Internet: <http://readwrite.com/2011/02/11/this_text_message_will_self_destruct_in_60_seconds>, (Feb. 18, 2015).

Sawers, Paul, "Snapchat for iOS Lets You Send Photos to Friends and Set How long They're Visible for", [Online]. Retrieved from the Internet: <http://thenextweb.com/apps/2012/05/07/Snapchat-for-ios-lets-you-send-photos-to-friends-and-set-how-long-theyre-visiblefor/#! xCjrp>., (May 7, 2012), 1-5.

U.S. Appl. No. 14/612,692, filed Feb. 3, 2015, Multichannel System.

U.S. Appl. No. 14/505,478, filed Oct. 2, 2014, Ephemeral Gallery of Ephemeral Messages.

U.S. Appl. No. 14/578,271, filed Dec. 19, 2014, Gallery of Videos Set to an Audio Time Line.

U.S. Appl. No. 14/634,417, filed Feb. 27, 2015, Ephemeral Gallery of Ephemeral Messages With Opt-In Permanence.

U.S. Appl. No. 14/304,855, filed Jun. 13, 2014, Geo-Location Based Event Gallery.

U.S. Appl. No. 14/738,069, filed Jun. 12, 2015, Geo-Location Based Event Gallery.

U.S. Appl. No. 14/523,728, filed Oct. 24, 2014, Priority Based Placement of Messages in a Geo-Location Based Event Gallery.

"U.S. Appl. No. 14/304,855, Corrected Notice of Allowance mailed Jun. 26, 2015", 8 pgs.

"U.S. Appl. No. 14/505,478, Non Final Office Action mailed Sep. 4, 2015", 19 pgs.

"U.S. Appl. No. 14/506,478, Response filed Aug. 17, 2015 to Advisory Action mailed Apr. 14, 2015", 10 pgs.

"U.S. Appl. No. 14/578,271, Final Office Action mailed Dec. 3, 2015", 15 pgs.

"U.S. Appl. No. 14/578,271, Non Final Office Action mailed Aug. 7, 2015", 12 pgs.

"U.S. Appl. No. 14/578,271, Response filed Jun. 19, 2015 to Restriction Requirement mailed Apr. 23, 2015", 6 pgs.

"U.S. Appl. No. 14/578,271, Response filed Oct. 28, 2015 to Non Final Office Action mailed Aug. 7, 2015", 9 pgs.

"U.S. Appl. No. 14/612,692, Examiner Interview Summary mailed Aug. 14, 2015", 3 pgs.

"U.S. Appl. No. 14/612,692, Final Office Action mailed Nov. 23, 2015", 15 pgs.

(56) References Cited

OTHER PUBLICATIONS

"U.S. Appl. No. 14/612,692, Non Final Office Action mailed Jul. 20, 2015", 25 pgs.

"U.S. Appl. No. 14/612,692. Response filed Oct. 19, 2015 to Non Final Office Action mailed Jul. 20, 2015", 11 pgs.

"U.S. Appl. No. 14/808,283, Preliminary Amendment filed Jul. 24, 2015", 8 pgs.

"International Application Serial No. PCT/US2015/035591, International Search Report mailed Aug. 11, 2015", 5 pgs.

"International Application Serial No. PCT/US2015/035591, International Written Opinion mailed Aug. 11, 2015", 5 pgs.

"International Application Serial No. PCT/US2015/053811, International Search Report mailed Nov. 23, 2015", 5 pgs.

"International Application Serial No. PCT/US2015/053811, Written Opinion mailed Nov. 23, 2015", 8 pgs.

"PearlEyes by Red Giant", © 2002-2015 Red Giant LLC, [Online]. Retrieved from the Internet: <URL: http://www.redgiant.com/products/pluraleyes/, (Accessed Nov. 11, 2015), 5 pgs.

Castelluccia, Claude, et al., "EphPub: Toward robust Ephemeral Publishing", Network Protocols (ICNP), 2011 19th IEEE International Conference on, IEEE, (Oct. 17, 2011), 18 pgs.

Clarke, Tangier, "Automatically syncing multiple clips and lots of audio like PluralEyes possible?", [Online]. Retrieved from the Internet: <URL: https://forums.creativecow.net/thread/344/20553, (May 21, 2013), 8 pgs.

Sawers, Paul, "Snapchat for ios lets you send photos to friends and set how long they're visible for", http://thenextweb.com/apps/2012/05/07/ snapchat-for-ios-lets-you-send-photos-to-f riends-and-set-how-long-theyre-visible-for, (May 2012), 1-3 pgs.

Trice, Andrew, "My Favorite New Feature: Multi-Clip Sync in Premiere Pro CC", [Online]. Retrieved from the Internet: <URL: http://www.tricedesigns.com/2013/06/18/my-favorite-new-feature-multi-cam-synch-in-premiere-pro-cc/, (Jun. 18, 2013), 5 pgs.

"U.S. Appl. No. 14/578,271,Response filed Feb. 9, 2016 to Final Office Action mailed Dec. 3, 2015", 10 pgs.

"U.S. Appl. No. 14/967,472, Preliminary Amendment filed Dec. 15, 2015", 6 pgs.

"International Application Serial No. PCT/US2015/056884, International Search Report mailed Dec. 22, 2015", 5 pgs.

"International Application Serial No. PCT/US2015/056884, Written Opinion mailed Dec. 22, 2015", 6 pgs.

International Application Serial No. PCT/US2015/065821, International Search Report mailed Mar. 3, 2016, 2 pgs.

International Application Serial No. PCT/US2015/065821,Written Opinion mailed Mar. 3, 2016, 6 pgs.

U.S. Appl. No. 14/505,478, Notice of Allowance mailed May 18, 2016, 2 pgs.

U.S. Appl. No. 14/505,478, Notice of Allowance mailed Apr. 28, 2016, 11 pgs.

U.S. Appl. No. 14/505,478, Response filed Mar. 4, 2016 to Non Final Office Action mailed Sep. 4, 2015, 12 pgs.

U.S. Appl. No. 14/612,692, Non Final Office Action mailed Mar. 28, 2016, 15 pgs.

U.S. Appl. No. 14/738,069, Non Final Office Action mailed Mar. 21, 2016, 12 pgs.

U.S. Appl. No. 14/808,283, Notice of Allowance mailed Apr. 12, 2016, 9 pgs.

U.S. Appl. No. 15/137,608, Preliminary Amendment filed Apr. 26, 2016, 6 pgs.

U.S. Appl. No. 15/152,975, Preliminary Amendment filed May 19, 2016, 8 pgs.

* cited by examiner

GALLERY OF MESSAGES FROM INDIVIDUALS WITH A SHARED INTEREST

FIELD OF THE INVENTION

This invention relates generally to exchanging electronic messages in a computer network. More particularly, this invention relates to a gallery of messages associated with a shared interest.

BACKGROUND OF THE INVENTION

Mobile devices, such as smartphones, are used to generate messages. The messages may be text messages, photographs (with or without augmenting text) and videos. Users can share such messages with individuals in their social network. However, there is no mechanism for automatically routing a message with content related to a shared interest to a gallery of messages.

SUMMARY OF THE INVENTION

A machine includes a processor and a memory connected to the processor. The memory stores instructions executed by the processor to receive a message and a message parameter indicative of a characteristic of the message, where the message includes a photograph or a video. A determination is made that the message parameter corresponds to a selected gallery, where the selected gallery includes a sequence of photographs or videos. The message is posted to the selected gallery in response to the determination. The selected gallery is supplied in response to a request.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
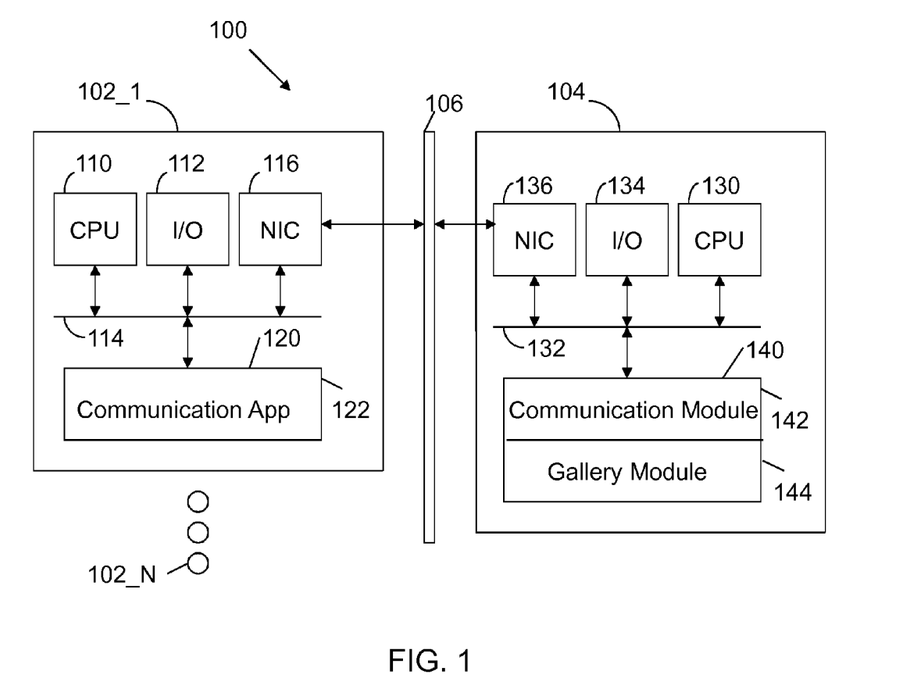
FIG. 1 illustrates a system configured in accordance with an embodiment of the invention.

FIG. 1 illustrates a system 100 configured in accordance with an embodiment of the invention. The system 100 includes a set of client devices 102_1 through 102_N and at least one server 104 connected via a network 106. The network 106 may be any combination of wired or wireless networks.

Each client device 102 has standard components, such as a central processing unit 110 and input/output devices 112 connected via a bus 114. The input/output devices 112 may include a touch display, dedicated control buttons, physical connectors, speakers and the like. A network interface circuit 116 is also connected to the bus 114 and provides connectivity to network 106. A memory 120 is also connected to the bus 114. The memory 120 stores a communication application 122. The communication application 122 includes instructions executed by CPU 110 to coordinate communications with server 104 and/or other client devices. In particular, the communication application 122 is operative with server 104 to exchange messages between client devices. The client device may be in the form of a tablet, smartphone, wearable technology, laptop computer or desktop computer.

The server 104 also includes standard components, such as a central processing unit 130, a bus 132, input/output devices 134 and a network interface circuit 136. A memory 140 is connected to the bus 132. The memory 140 stores a communication module 142. The communication module 142 includes instructions executed by the CPU 130 to coordinate communications with client devices 102. More particularly, the communication module 142 coordinates the exchange of messages between client devices 102. The memory 140 also stores a gallery module 144. The gallery module 144 includes instructions executed by the CPU 130 to store messages from individuals with a shared interest or some other association. Examples of types of associations contemplated by embodiments of the invention include photos or videos taken by users that include the same or similar object(s), such as guitar from a particular manufacturer, a designer handbag, a soft drink or beer can, etc. The messages form a gallery, which may be supplied to a client device 102 in response to a request from a client device 102. The gallery may be a sequence of photographs and/or videos. Any of a text message, user drawings/ annotations, animations, photo filters may be associated with a photograph or video (e.g., as an overlay). In one embodiment, the gallery is available for a specified transitory period of time (e.g., a day, during an event, etc.).

Figure 2:
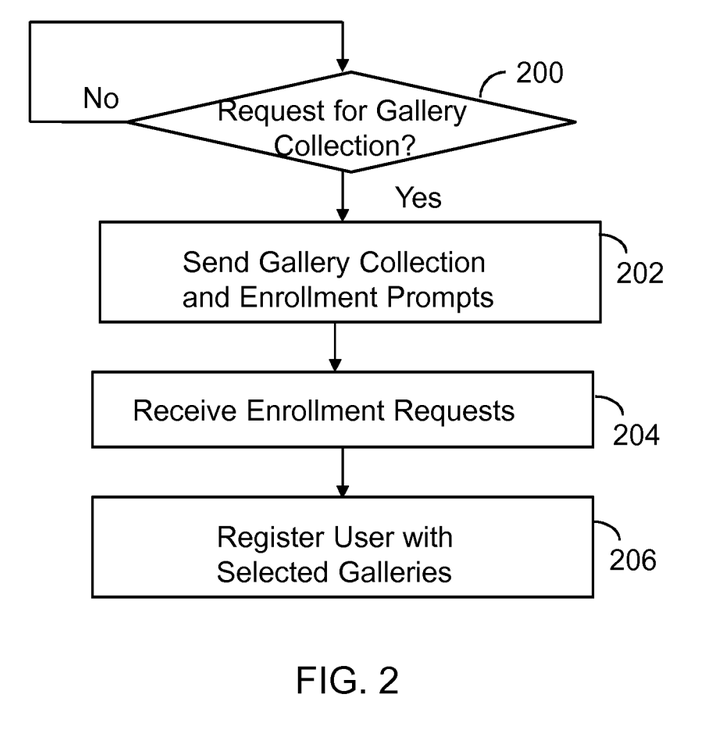
FIG. 2 illustrates a registration process utilized in accordance with an embodiment of the invention.

FIG. 2 illustrates a process for registering users with common interests that desire to participate in posting to a gallery. This process may be implemented by the gallery module 144. The gallery module 144 waits for a request for a gallery collection 200 from a client device 102. In the event of a request (200—Yes), a gallery collection and enrollment prompts 202 are sent from the server 104 to a client device 102.

Embodiments contemplate that a request could include an express request sent by a user. For example, a user may request to participate in a gallery by navigating to a 'request' screen from a user interface on the device display. In these examples, the user may select from any number of existing galleries or create a new gallery by keying in or otherwise describing the gallery. Another example of an express request to participate in a gallery may include an action on the part of the user from an annotation feature offered from an image. For instance, after a picture or image has been taken, some embodiments allow a user to add text, graphics, images, etc. to the picture/video. During this annotation process, the input and detection of a particular key or swipe may be used to indicate an intent to add that picture/video to a particular gallery. As an example, the use of a hashtag ("#") or swipe added to the text "Clippers" may be used to submit the picture/video to a Clippers gallery.

In addition to express user requests to submit content to a gallery, passive requests are also contemplated. For example, the detection of a particular object in a picture or video (detected using, e.g., object recognition processes to detect an object or audio fingerprinting technologies to detect a song, etc.) could be used to prompt a user to join a gallery associated with the object or even automatically post to an existing gallery (e.g., with the user's consent). For example, if a user takes a picture or video of a Coca Cola bottle, upon detection of the bottle, the user may be asked if he or she wishes to participate in a Coca Cola gallery. Alternatively, the user may be asked if he or she wishes to post directly to a gallery without joining. In yet other embodiments, the user's video or picture may be posted directly to the gallery (perhaps after receiving a blanket authorization at some point earlier).

In additional embodiments, a revenue sharing process may be implemented to facilitate payments to the user for use of his or her image. For example, a user image may be added to a gallery sponsored by Coca Cola and in return for contributing to Coca Cola's gallery, a user may receive compensation on a flat-fee, per view or revenue share basis.

Figure 3:
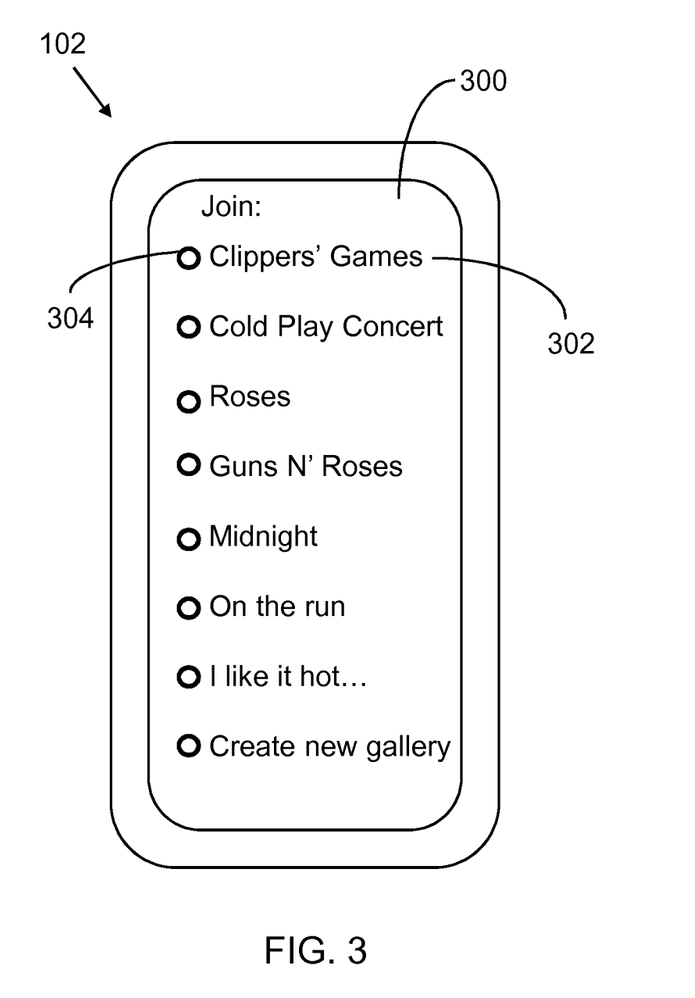
FIG. 3 illustrates a gallery collection with enrollment prompts utilized in accordance with an embodiment of the invention.

FIG. 3 illustrates an example of a gallery collection 300 displayed on a client device 102. The gallery collection 300 may be supplied by activating an icon (such as icon 402 of FIG. 4). Alternately, the gallery may be supplied in accordance with the examples provided above. The gallery collection 300 includes individually listed galleries, such as 302 and an associated prompt 304. In this example, the prompt 304 is a radio button, selection of which results in a selected gallery. Hovering over or tapping the text description 302 of the gallery may result in the display of additional information about the gallery. In the case of "Clippers' Games" a gallery is formed during the course of each basketball game played by the Clippers. Thus, the gallery is a recurring gallery. Messages associated with the Clippers are posted during the course of each basketball game. Thus, a collection of messages is available for the transitory duration of each basketball game. Of course, other examples are also possible including availability for a set amount of time after the event (e.g., twenty-four hours, one week, etc.).

The next example in the gallery collection 300 is a concert. This is a single event gallery that lasts for a set amount of time after the duration of the event. The next example in the gallery collection 300 is for a shared interest in an object, such as roses. This may be an ongoing gallery that is used by registrants to post photographs or videos of roses.

The next example in the gallery collection 300 is for the band Guns N' Roses. This gallery is constructed to receive messages from individuals with a shared interest in the band. In one embodiment, individual songs from the band may be selected. Thereafter, messages that reference or incorporate the individual songs may be posted to the gallery.

The collection may also include a theme such as midnight. Messages generated on or around midnight are posted to the gallery. The messages may be identified by a timestamp associated with the message.

The collection may also include a theme such as "on the run". This gallery is constructed to receive messages from client devices that are in motion (as measured by an accelerometer, gyroscope, GPS signal and the like associated with the client device). Messages from such devices are posted to the gallery.

The collection may also include a theme such as "I like it hot . . . " to post messages when the temperature in a geolocation associated with a message exceeds some threshold (e.g., 90° F.). The geolocation may be where the message is generated. The temperature may be obtained for the specified geolocation by any number of online weather information resources or from a thermometer device built into the device.

A final option shown in FIG. 3 is a request to create a new gallery. Activating the associated radio button 304 may result in a set of prompts that allows a user to define a new gallery. The definition may include a gallery name, keywords associated with the gallery, objects associated with the gallery, and the like.

Returning to FIG. 2, the gallery module 144 receives enrollment or participation requests 204. In response to such requests, a user is registered with one or more selected galleries. Thus, a user registers with one or more selected galleries 206. Thereafter, any message relevant to a selected gallery is automatically routed to the selected gallery. This may be accomplished without the user separately designating the gallery as a destination for the message. A single message may be automatically routed to several galleries if the message has indicia relevant to each of the several galleries.

Figure 4:
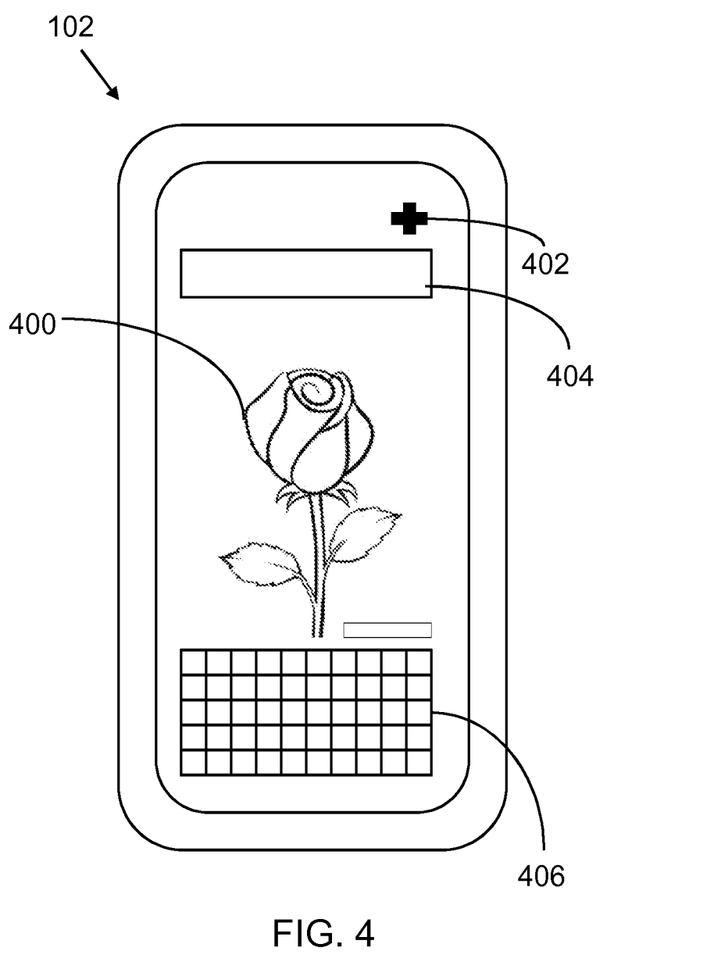
FIG. 4 illustrates a message generation interface utilized in accordance with an embodiment of the invention.

FIG. 4 illustrates a client device 102 that has taken a picture of a rose 400. The communication application 122 and/or gallery module 144 may be configured with instructions executed by the processor to recognize the rose (e.g., machine vision may be used to designate the object as a rose). If the user is registered with the rose gallery, the message is automatically routed to the rose gallery. An icon 402 may be supplied to annotate a message. Activation of the icon 402 may result in a text entry box 404 being supplied, along with a keyboard. The user may designate that the message includes a rose or may type in any other type of message. A message recipient list may be invoked through the icon 402 or through a swiping motion. The message recipient list is an existing list of contacts for the user. Each contact selected will receive a copy of the message via routing through the communication module 142. Thus, for this message there are intentionally designated message recipients. However, depending upon the number of galleries that a user is registered with, the message may be automatically forwarded to relevant galleries without the user designating such galleries for the message.

Figure 5:
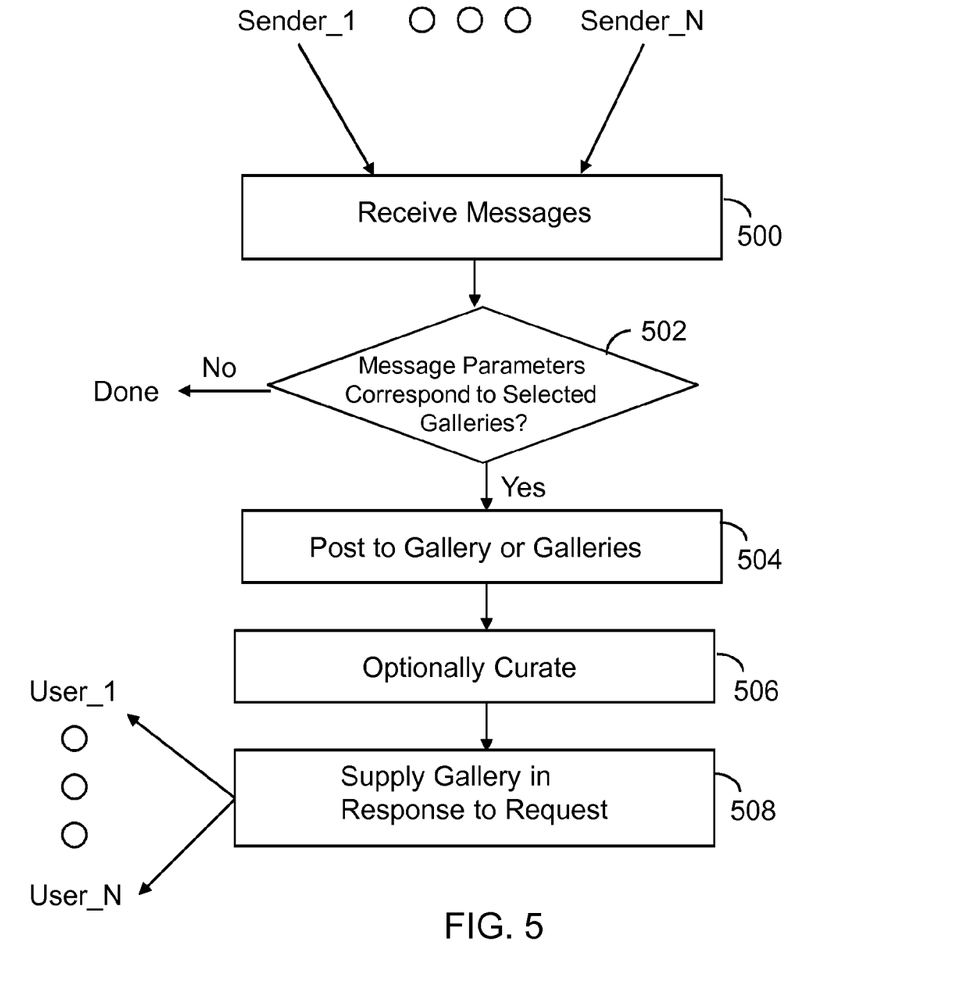
FIG. 5 illustrates server side processing performed in accordance with an embodiment of the invention.

FIG. 5 illustrates operations associated with an embodiment of the gallery module 144. The top of the figure illustrates a set of message senders, i.e., Sender_1 through Sender_N. Each message sender is associated with a client device 102.

The server 104 receives messages 500 from any number of senders. Each message is evaluated to determine whether message parameters correspond to selected galleries 502. For example, if the user has registered for the roses gallery and generates the message shown in FIG. 4, then the message corresponds to a selected gallery (502—Yes). Any number of message parameters may be used. For example, in the case of the rose picture in FIG. 4, the rose may be a designated object from machine vision operations performed by the gallery module. Alternately, or in addition, text associated with the message may be a parameter that is evaluated for relevance to a selected gallery. For example, optical character recognition or word matching techniques may be used to link a message with a gallery. Each gallery may have an associated collection of key words and/or designated objects that are used to determine correspondence between a message and a gallery. Other message parameters may include a time stamp (relevant to the midnight gallery), speed indicia (relevant to the "on the run" gallery) and temperature (relevant to the "I like it hot . . . " gallery).

If the message does not have a parameter relevant to a selected gallery (502—No), then processing by the gallery module 144 is completed. The message is then routed in a standard manner by the communication module 142. If the message does have a parameter corresponding to a selected gallery (502—Yes), the message is posted to one or more galleries 504.

The gallery module 144 may include a curation interface that allows a gallery administrator to optionally curate the gallery 506. For example, the curation interface may allow the administrator to delete inappropriate or redundant messages. Alternately, machine vision and content rules may be used to automatically curate the gallery. In embodiments that include compensation to be paid to a user, the curation interface may be configured to make automatic payments to the users for the use of their pictures or videos. The final operation of FIG. 5 is to supply the gallery in response to requests 508 from any number of users.

Embodiments of the invention utilize galleries with specified transitory periods of time (e.g., a day, or during an event). Each gallery may include individual messages shown in sequence, where the individual messages are photographs or videos. Text may accompany a photograph or video, as shown in connection with FIG. 4.

An embodiment of the invention has a gallery with content set to an audio time line. In some embodiments, the audio time line could be a song or a video clip. As discussed in connection with FIG. 3, a band may have a designated gallery with a selectable song. If a user registers with a song then a message that incorporates the song may be posted to the gallery. Embodiments of the invention utilize short (e.g., 3-6 seconds) video messages. Therefore, a collection of messages can be constructed for different segments of the audio time line associated with a song. As a result, a single song may have an associated mash-up of video segments. Observe here that the audio time line determines the video content. Typically, video content is used to establish a sequence of videos. The use of the audio time line as a guiding factor results in interesting and artistic combinations of videos.

Instead of a song, the audio time line may be a narrative, such as a speech or a dialogue. For example, a "Gettysburg Address" gallery may be formed with a voice over of the famous speech by Abraham Lincoln. Video segments that include words from the speech may be combined to populate a complete audio time line for the speech. Consequently, a voice over of the speech may have an associated mash-up of video segments.

There are known techniques for evaluating audio content. In particular, there are online services, such as Shazam® and Soundhound®, which provide real-time identification of songs and other audio tracks. The gallery module 144 may be configured to access such online services and/or incorporate its own audio fingerprint identification techniques. The object recognition and fingerprinting operations disclosed herein may be performed on any of client device 102, server 104 or a third-party device (not shown).

As described above, embodiments contemplate that a user could be compensated by e.g., the audio time line owner or rights holder for helping to create and promote a particular song or content. Thus, a user that contributes to an audio time line could be compensated by some amount for each viewing of the time line.

Figure 6:
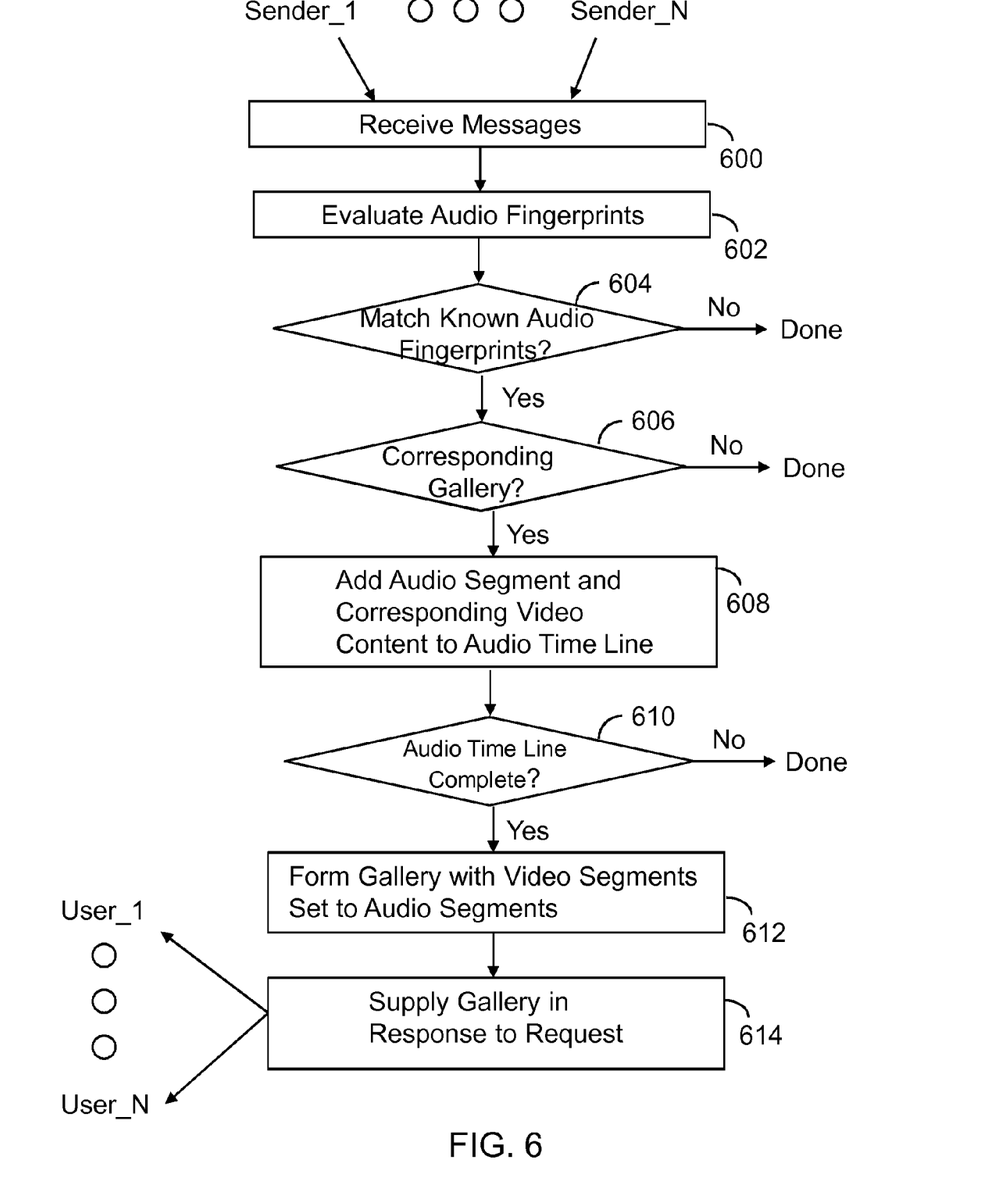
FIG. 6 illustrates server side processing associated with another embodiment of the invention.

FIG. 6 illustrates audio time line processing performed in accordance with an embodiment of the invention. The gallery module 144 receives messages 600 from any number of message senders (Sender_1 through Sender_N). Each message is evaluated for audio fingerprints 602. If there are no matches to known audio fingerprints (604—No), then the gallery module 144 processing is completed and the message is routed in a standard manner using communication module 142.

If matches with known audio fingerprints are established (604—Yes), a determination is made whether there is a selected gallery with the same audio fingerprint. That is, has the message sender registered with a gallery with the same audio fingerprint. If not (606—No), processing is complete. If so (606—Yes), the audio segment and corresponding video content are added to the audio time line 608. For example, the video message may have audio fingerprints for seconds 58 through 66 of a video time line. The video message is then positioned at that location on the video time line.

It is then determined whether the audio time line is complete 610. If not (610—No), the processing of the message is completed and the process may wait for the submission of additional segments for possible inclusion into the audio time line. If so (610—Yes), a gallery is formed with video segments set to audio segments 612. The audio segments may be a master track of a song or narrative. Alternately, the audio segments from the videos themselves may be used. Different criteria may be used to determine whether and audio time line is complete. All time slots in the audio time line need not be filled.

The resultant gallery is then supplied to users in response to requests 614. Thus, users may obtain crowd sourced video mash-ups set to an audio time line.

Those skilled in the art will appreciate that the disclosed techniques provide improved technical results in the field of message combining and sharing. Messages are automatically shared with others that have a common interest, as expressed through a registration process. After the registration process, collections of messages are automatically generated based upon automated evaluation of message content. This automatic process may or may not be executed without a user interface and user input at the server. Thus, an autonomous message combining and sharing system is disclosed that omits the cost of a human operator and is able to operate as fast as a processor operates.

Embodiments of the invention include ephemeral galleries that reduce power consumption and administrative overhead. The ephemeral galleries may be configured for self-execution, for example, by setting message parameters that will establish inclusion in a gallery and setting a transitory gallery period defined by an open time and a close time. The gallery may be associated with a single ephemeral time period (e.g., in the case of a concert) or a recurring ephemeral time period (e.g., in the event of galleries for each basketball game played).

The crowd sourced galleries provide content from many perspectives. An embodiment of the invention establishes innovative video mash-ups set to an audio time line as opposed to a flow of video images. Thus, establishing a novel technique for message combining.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A server computer in a content distribution system, comprising:
   a processor; and
   a memory coupled with the processor, the memory storing instructions executable by the processor to cause the server computer to:
   receive a plurality of messages from a plurality of client devices, each message of the plurality of messages including a message parameter indicative of a characteristic of the message, and a photograph or a video;
   analyze each message parameter and photograph or video to determine that the message parameter or photograph or video corresponds to one or more predetermined galleries by the characteristic of the message or by recognizing an object in the photograph or video, the one or more predetermined galleries each including a sequence of photographs or videos from a plurality of users sharing a common interest;
   post the message to the one or more predetermined galleries;
   receive a request for a selected gallery from the one or more client devices; and
   supply the selected gallery in response to the request.

2. The server computer of claim 1, the memory further storing instructions executable by the processor to cause the server computer to curate the selected gallery according to instructions to remove selected photographs or videos.

3. The server computer of claim 1, the memory further storing instructions executable by the processor to cause the server computer to:
   send a gallery collection and corresponding enrollment prompts to a user;
   receive an enrollment request from the user for the selected gallery; and
   register the user with the selected gallery.

4. The server computer of claim 3, wherein the instructions executable by the processor to cause the server computer to send a gallery collection and corresponding enrollment prompts to a user are executed in response to an express request from the user.

5. The server computer of claim 3, wherein the instructions executable by the processor to cause the server computer to send a gallery collection and corresponding enrollment prompts to a user are in response to an evaluation of content associated with the message.

6. The server computer of claim 1, wherein the memory stores further instructions executable by the processor to cause the server computer to supply prompts that solicit the definition of a new gallery.

7. The server computer of claim 6 wherein the prompts include prompts to solicit a gallery name.

8. The server computer of claim 6 wherein the prompts include prompts to solicit gallery keywords.

9. The server computer of claim 6 wherein the prompts include prompts to solicit a gallery object.

10. The server computer of claim 1 wherein the message parameter is a designated object in the photograph or video.

11. The server computer of claim 10 wherein the designated object is specified by a sender of the message.

12. The server computer of claim 1 where the parameter is a time stamp associated with the message.

13. The server computer of claim 1 wherein the parameter is speed indicia associated with a device that generates the message.

14. The server computer of claim 1 wherein the parameter is a temperature associated with the location at which the message is generated.

15. The server computer of claim 1 wherein the selected gallery is available for a specified transitory period of time.

16. The server computer of claim 1 wherein the message has text accompanying the photograph or the video.

17. The server computer of claim 1 wherein the memory stores instructions executed by the processor to automatically pay a message sender when a message from the sender is posted to the selected gallery.

18. A method comprising:
   receiving, at a server computer, a plurality of messages from a plurality of client devices, each message of the plurality of messages including:
      a message parameter indicative of a characteristic of the message, and
      a photograph or a video;
   analyzing, by the server computer, each message parameter and photograph or video to determine that the message parameter or photograph or video corresponds to one or more predetermined galleries by the characteristic of the message or by recognizing an object in the photograph or video, the one or more predetermined galleries each including a sequence of photographs or videos from a plurality of users sharing a common interest;
   posting, by the server computer, the message to the one or more predetermined galleries;
   receiving, at the server computer, a request for a selected gallery from the one or more client devices; and
   supplying, by the server computer, the selected gallery in response to the request.

19. The method of claim 18, wherein analyzing each message parameter and photograph or video to determine that the message parameter or photograph or video corresponds to one or more predetermined galleries further comprises utilizing audio fingerprint identification techniques to determine that the message parameter or photograph or video corresponds to one or more predetermined galleries.

20. The method of claim 1, wherein the common interest includes at least one of a group comprising: a particular object, a sports team, a sports event, a concert, a time of day, a motion, and a temperature in a geolocation.

* * * * *